(12) United States Patent
Meier et al.

(10) Patent No.: US 7,743,591 B2
(45) Date of Patent: Jun. 29, 2010

(54) RESEARCH PLOT HARVESTER FOR CONTINUOUS PLOT TO PLOT GRAIN EVALUATION

(75) Inventors: Kevin W. Meier, Ogden, IA (US); Dan Larson, Ankeny, IA (US); Mike J Argetsinger, Ankeny, IA (US); John M Gass, Slater, IA (US); Terry Henning, Maxwell, IA (US); Brian W Meier, Ogden, IA (US); Alan B Meiners, Dedham, IA (US)

(73) Assignee: Syngenta Participations, AG, Basel (CH)

( * ) Notice: Subject to any disclaimer, the term of this patent is extended or adjusted under 35 U.S.C. 154(b) by 940 days.

(21) Appl. No.: 11/351,430

(22) Filed: Feb. 10, 2006

(65) Prior Publication Data

US 2007/0186530 A1 Aug. 16, 2007

(51) Int. Cl.
*A01D 34/00* (2006.01)

(52) U.S. Cl. ......................................... 56/14.6; 56/14.5

(58) Field of Classification Search .............. 56/10.2 R, 56/14.3–14.6, 119, 364, 16.4 R, 16.5, 16.6, 56/219–222
See application file for complete search history.

(56) References Cited

U.S. PATENT DOCUMENTS

| | | | |
|---|---|---|---|
| 2,142,587 A * | 1/1939 | Lindgren et al. | ............... 56/123 |
| 3,772,862 A | 11/1973 | Wilson | |
| 3,798,884 A | 3/1974 | Middleton | |
| 3,930,354 A | 1/1976 | Borderie | |
| 4,177,628 A | 12/1979 | Brandt | |
| 4,209,918 A | 7/1980 | Klein | |
| 4,218,864 A | 8/1980 | Allemeersch | |
| 5,518,454 A | 5/1996 | Twilley et al. | |
| 6,339,917 B1 | 1/2002 | Dillon et al. | |
| 6,681,551 B1 * | 1/2004 | Sheidler et al. | .......... 56/10.2 G |
| 6,848,243 B2 | 2/2005 | Carr et al. | |
| 7,318,310 B2 * | 1/2008 | Kincaid | ...................... 56/14.6 |

OTHER PUBLICATIONS

HarvestMaster brochure.

* cited by examiner

*Primary Examiner*—Alicia M Torres
(74) *Attorney, Agent, or Firm*—Dana Rewoldt

(57) ABSTRACT

The invention relates generally to harvesters and, more particularly, to a combine for harvesting row crops, which has been modified, to collect and measure grain continuously from a plurality of strip test plots.

20 Claims, 5 Drawing Sheets

RESEARCH PLOT HARVESTER FOR CONTINUOUS PLOT TO PLOT GRAIN EVALUATION

BACKGROUND OF THE INVENTION

The invention relates generally to harvesters and, more particularly, to a combine for harvesting row crops, which has been modified, to collect and measure grain from two or more separate small strip test plots.

It is common in the seed industry to grow and collect data on a large number of test varieties to evaluate the individual varieties for possible advancement toward commercialization. Frequently, each variety being evaluated is grown at a plurality of locations to collect data under a range of growing conditions. Among the data collected are the weight of the grain harvested from the strip test plots and the moisture of the grain at harvest. Each strip test plot typically consists of one or several rows of a length of approximately 20 feet. Each plot or row of plots is separated from the next row of plots by an open area which is usually an unplanted or grassy section of land or planted with plants that are not the desired plants for harvest.

It is known in the prior art to modify conventional harvesters by the addition of a weigh bucket which receives and weighs the grain collected off of each strip test plot, measures the moisture of a sample of the collected grain, and then discharges the grain into a bulk reservoir where it is commingled with grain harvested off of other strip test plots. The data collected is typically stored in a local memory device for subsequent processing.

The process of measuring and collecting grain begins with the advancement of the harvester through the strip test plot, and then stopping the harvester at the end of the strip test plot, measuring the collected grain and then beginning advancement into the adjacent strip test plot. The ground travel of the harvester is stopped while the threshing and cleaning action of the harvester is continued in order to process the entire quantity of grain collected through the harvester for delivery to the weigh bucket. After all of the grain collected off of the subject strip test plot has been processed and delivered to the weigh bucket, the harvester can then be advanced into the next strip test plot. The dwell time between strip test plots is, accordingly, a function of how quickly the collected grain is threshed and cleaned by the harvester and conveyed to the weigh bucket.

The prior art also includes harvesters that have the capacity to collect grain from two separate strip tests through the use of a dual harvester, e.g. a harvester that has two separate halves. This harvester reduces the time to complete strip plots as two strips are done at once.

One example of a dual strip plot harvester has the clean grain tank positioned at the top of the harvester. This requires that two separate weigh buckets be positioned beside the cab of the harvester or above the clean grain reservoir so that grain will discharge directly into the reservoir after the grain has been measured. This positioning of the weigh bucket can increase substantially the already tall height of the harvester with the result that the weigh bucket must be moved from its operative position or totally removed to permit the harvester to comply with federal regulations for travel on the highway and to pass through the door of machine sheds or other equipment shelters.

Additionally, the prior art includes U.S. Pat. No. 5,518,454 which shows a harvester with unconventional grain flow for collecting and measuring grain grown on strip test plots. The conventional harvester places a single weigh bucket for measuring grain at the grain storage location. The '454 modifies the placement of the weigh bucket by reversing the grain flow of a lateral conveyor and locating the weigh bucket at a low position inside the vertical confines of the harvester. Thus reducing the time required for moving harvested grain to the weigh bucket and the waiting time required between harvesting of successive strip plot tests.

This single harvester saves time in speeding the weighing step but does not allow for more then one strip plot to be processed at a time. The two dual harvesters save time by harvesting more strip plot rows to be harvested at the same time but all prior art's harvest speed was limited by the dwell time which is dependent on the time needed for threshing, cleaning and data collection from the harvested grain in the harvester. When the dwell time was completed only then could the prior art harvester begin harvesting the adjacent plot.

However, the dual harvester like the single harvester can only harvest as quickly as the length of dwell time needed to complete the grain threshing, cleaning and data collection of the plot. When this is completed then the prior art harvester could begin harvesting the adjacent plot.

The prior art has addressed the dwell time concern in U.S. Pat. No. 6,848,243 entitled method and apparatus for continuously harvesting grain from a row of mature grain plants comprised of plant segments and alley segments (plant segments are the plants in the plots and alley segments are the border lanes between the strip plots). The U.S. Pat. No. 6,848,243 is hereby incorporated by reference into this specification. The invention underlying this patent is a method and apparatus for continuously harvesting the grain instead of stopping the ground travel of the harvester in the border lane for dwell time. The object of the invention was to enhance the harvesting operation by continuously have the combine travel at a constant speed through the field—thorough the strip plots and border lane without stopping in the border lane for dwell time. Thus avoiding the stopping and starting of the harvester in the border lanes, but unfortunately exchanging the starting and stopping of the travel movement for the stopping and starting of grain moving parts of the combine. This system of stopping or interrupting the grain moving parts of the combine is inefficient and cause unnecessary wear and tear on the harvester. In an alternative embodiment of an invention in U.S. Pat. No. 6,848,243 teaches the addition of a movable blocking gate that is located along the grain handling assembly which blocks the flow of grain along the grain handling assembly. In this embodiment, the combine continuously travels and the grain flow is interrupted by closing a newly inserted additional structure onto the combine, a blocking gate. The blocking gate like the cross auger is operated by a controller that is capable of selectively and separately operating each of the grain moving parts. When the controller is activated the blocking gate is moved vertically to block the grain flow. The patent in the drawings locates the blocking gate between the cross auger and the drag chains; however, the written description in column 2 at lines 34 and 35 describes the gate as being located between the cross auger and the head. Regardless of the gate's location it is an additional piece of equipment that is not essential for harvesting crop. Additionally, the invention of U.S. Pat. No. 5,518,454 teaches the use of two conventional separate collection bins to permit separate evaluation of the harvested grain in each row segment.

There remains a need for an improved continuously traveling harvester which does not require the interruption of the grain moving parts nor the addition of a gate that is not essential to the harvester's ability to harvest.

Furthermore there is a need for a continuously traveling harvester that does not utilize two separate bins but instead has one unit adapted to keep the grain segregated. This unit or two separate bins can adapted for weighing and data collection by a single evaluation mechanism.

SUMMARY OF THE INVENTION

An object of the invention is to provide a harvester for collecting and measuring grain from strip test plots which substantially reduces the amount of time required to collect and measure grain from a plurality of strip test plots.

Another object of the invention is to provide a strip test plot harvester wherein the weigh buckets are positioned within the vertical and transverse confines of the harvester.

Another object of the invention is to provide a strip test plot harvester wherein a single weigh bucket can be employed and positioned within the vertical and transverse confines of the harvester by employing a dual holding bin adapted to deposit one plot worth of grain into the weigh bucket than deposit the other plot worth of grain from the other side of the holding bin in an alternating pattern.

A further object of the invention is to provide a strip test plot harvester which continuously travels and does not stop for dwell time wherein the grain is harvested in a more efficient manner.

Yet another object of this invention is to locate sensor and control electronics of the grain measuring apparatus is located near the grain measuring apparatus whereas means for recording collected data is located in the operator's cab.

A combine harvester adapted harvest a crop which comprises the following a main frame; which supports a harvesting head that has a grain feeding assembly located proximate at least one cross auger and auger trough. The cross auger can be in at least two separate positions. Both a first and second position of the cross auger is described relative to the auger trough. The present invention also has at least one threshing (which includes the feeder house), separating and cleaning assembly mounted to the main frame. This plot harvester's processing assembly is adapted to receive crop comprising straw and grain from the cross auger and extract clean grain from said crop. Once the clean grain is extracted the harvester moves the clean grain with at least one conveyor in a position to be weighed and measured. Weighing and measurement of grain is the primary function of a research plot harvester. To do this the harvester has at least one weigh bucket positioned for receiving and measuring clean grain and equipment for measuring and recording the data collected concerning the grain; and a grain tank for receiving commingled clean grain weighed by at least one weigh bucket. The present invention is a combine harvester with a first position of cross auger positioned partially within the trough and a second position where the auger not positioned partially within the trough. So that when the auger is in the second position the grain feeding assembly harvests said crop and moves the crop proximate the auger trough and the crop is accumulated in the auger trough.

This allows the harvester to continue harvesting the crop without commingling any the crop material from two plots prior to the first plot being weighed and measured. After commingling is no longer an issue, at least by the time the first plot is weighed and measured, the cross auger is restored to the first position and the accumulated crop proximate the auger trough is fed into the feeder house proximate the threshing assembly.

For simplicity this harvester has been described as a single plot harvester. However, dual plot harvesters are well known.

The ordinarily skilled person in the art is aware of combines that have not one but two compartments to evenly divide the seed from separate varieties so avoid commingling. Therefore the present invention may encompass a combine harvester with a divided cross auger and a divided auger trough adapted to maintain two crops from being commingled.

If there is a divided cross auger which is formed as two separate cross augers then each cross auger has one of two positions one position being partially within the trough, so that the crop proximate the auger trough is fed into the feeder house into the threshing assembly and a second position where the cross auger is not positioned partially within the trough, and the crop proximate the auger trough accumulates.

The present combine harvester can have an embodiment with at least one conveyor for moving clean grain is conveying the grain in a reverse grain flow path. A reverse flow path is when the grain moves to the left of the combine when looking at the back end of the combine and facing the direction of forward travel of said combine. The reverse flow path decreases the time required to complete the data collection and it avoids the overly tall combines. The data collection mechanisms are located on the side of the combine and not above by the commingled grain bin. So in the present invention in the reverse grain flow embodiment (where or not it is a dual plot harvester or not) the clean grain does not travel almost all the way to the commingled grain bin prior to weighing the material it only travels to the side then the data is collected. This means that less time is required to fully process the harvested material and therefore there is less time spent harvesting the succeeding plot with the auger in the nonengaged position then when the standard grain flow path is employed.

In an embodiment of the invention the means for moving the auger between positions is at least one cylinder. This cylinder, usually a pair of cylinders would be used one at each end of the auger, can be activated to move the cross auger when an optical eye senses a lane between said plots, or when an optical eye senses that the there is no grain in the weigh bin or the sample bin. There is a number of differing timing or positional or sensing devices that can be used and are know to those of skill in the art to signal when the auger should be moved.

The present invention broadly can be described as having an improvement on continuous travel harvesters the improvement comprising a grain feeding assembly located proximate at least one rotating cross auger and its associated auger trough, the cross auger having two rotating positions, a crop engaging position proximal the auger trough and a crop non-engaging position distal to the auger trough. If the length of time required to weigh and collect the data from clean harvested grain is more than a couple of seconds the auger trough of the harvester head can be adapted to retain more harvested material.

In operation the present invention is used in a method for continuously harvesting with a research combine, and measuring grain from one or more varieties/hybrids of crop within plots divided by lanes where the lanes do not include crop. The harvesting method comprising the steps of: harvesting with a harvester having grain moving parts which transport a crop into a feeding assembly. The crop is from a discrete plot of a plurality of plots divided by lanes. The feed assembly delivers crop from each individual plot's variety or hybrid to a cross auger which is associated with an auger trough from there the crop material is transported to the processing assembly. The processing assembly operates to extract the grain from the straw, and clean grain is then measured and weighed. The harvester is traveling continuously from a harvested plot across a lane to a succeeding discrete plot within the plurality of research plots. When the harvester has moved out of one plot and into a lane the cross auger is activated and moved into a crop nonengaging position. When in this position the crop from the succeeding plot is delivered to the auger trough but is not delivered to the processing assembly. The grain only gets moved into the processing assembly when the cross auger is in the crop engaging position. The movement between positions is triggered or signaled when the cleaned grain from the previous plot has been conveyed from the processing assembly into the weigh bins, therefore avoiding commingling of the grain of the first plot crop with the succeeding plot crop. So while the harvester is moving through the succeeding plot and possibly as soon as the harvester reaches the lane prior to the succeeding plot the auger is in the non engaged position until the clean grain from the previous plot is positioned to avoid commingling with the second plot's grain prior to data collection. When the risk of commingling of grain prior to data collection is complete then the harvester is activating the cross auger into a crop engaging position. When the auger is repositioned into engagement the crop accumulated within the auger trough and the crop harvested by feeding assembly from the succeeding plot can then be transported into the processing assembly. The cycle of engagement and nonengagement is repeated throughout the harvesting of the plurality of plots. Thus the grain from the succeeding plot is removed from the straw, and clean grain from the succeeding plot is conveyed to be measured and weighed separately from crop material from any other of the plurality of crops while the harvester is continuously traveling.

This method works when the harvester is a dual plot harvester or/and when the harvester has a reverse grain flow such that the clean grain is conveyed to the left side of the harvester when viewed from the rear of the harvester facing the direction of forward travel of the harvester.

The method includes a number of means for activating of the cross auger, including when this activation is automated. In the present invention the cross auger in the engaging position rotates and also can rotate in the nonengaging position. Thus the grain moving parts of the harvester are not necessarily interrupted during the continuous traveling and harvest of the plurality of the plots.

These and other objects of the invention will be understood by a person of skill in the art upon a review of the specification, associated drawings, and appended claims.

DETAILED DESCRIPTION OF A PREFERRED EMBODIMENT

Figure 1:
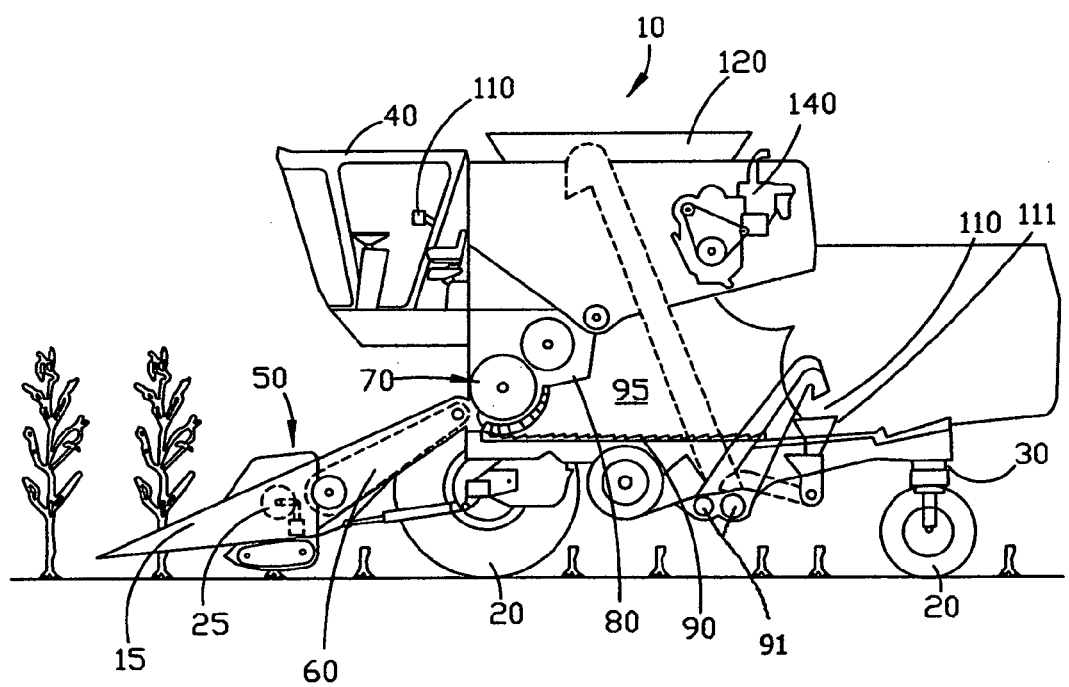
FIG. 1 is a left side view of a harvester of one embodiment of the present invention.
Figure 2:
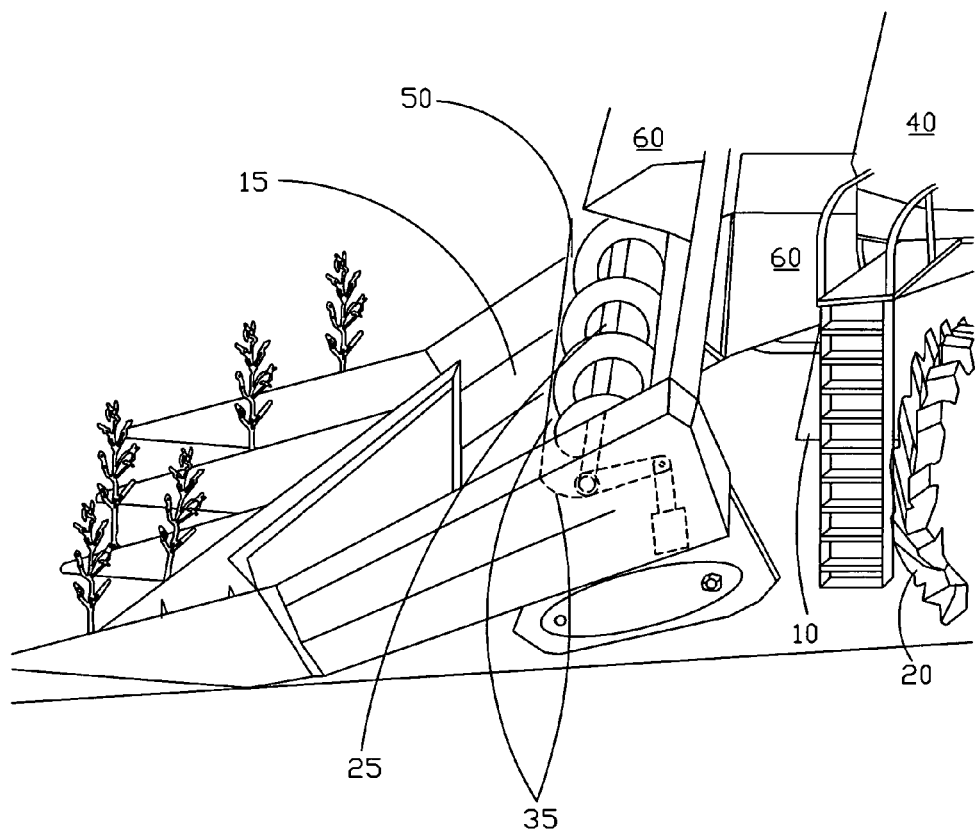
FIG. 2 is a view of the cross auger and the feeding assembly.

Referring to FIG. 1 there is illustrated, a row crop combine harvester which incorporates the present invention. The harvester 10 in one embodiment is a John Deere model 3300, although the teachings of the invention can be applied to other harvesters as well. Seed development and production requires testing of plants, which are grown from seed, in the types of environments in which the plants are expected to be grown. Research plots which are about 20 feet long are planted in fields in various environments to test the plants response. The tests usually include measuring the grain yield and moisture. Other measurements concerning the plant health, pest and disease pressures may also be monitored.

Figure 3:
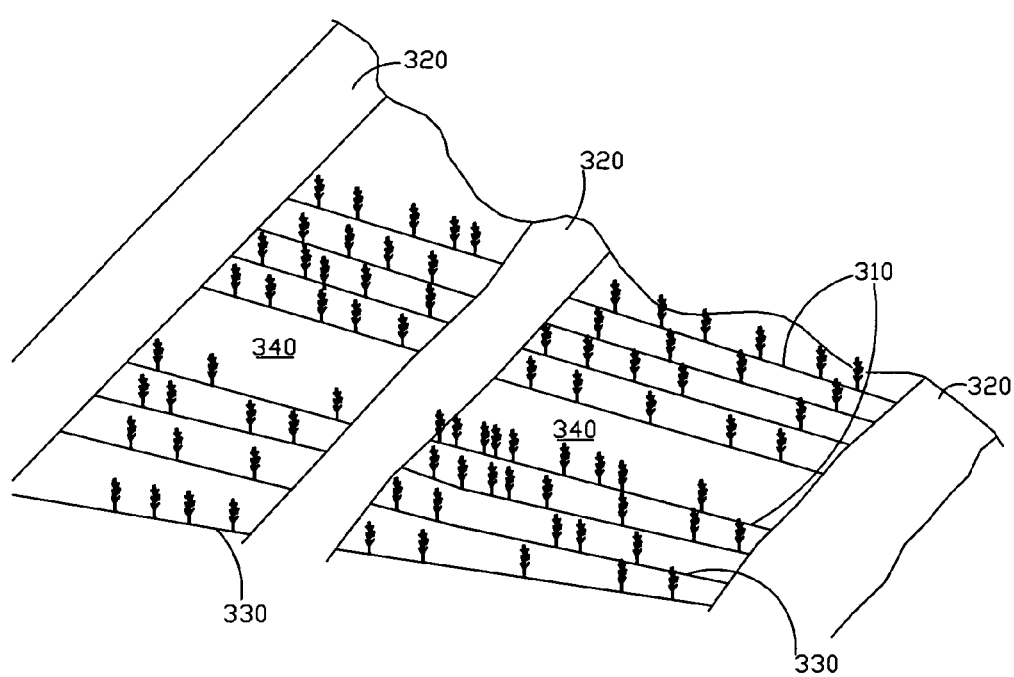
FIG. 3 is a view of a plurality of plots.

The science of breeding requires that a large number of potential plants be tested in plots in order to locate and develop a few plants that will have all of the necessary components to produce consistent crop yield and moisture. The plots are small sections of fields which have short rows and are divided one from another by borderland forming lanes between the plots. FIG. 3 shows a typical set of research plots 310. Each research plot is divided from the next research plot by a lane 320 that usually runs substantially perpendicular to the direction of the planted rows 330. Each research plot 310 may also be separated from a neighboring plot by columns of land 340 that run parallel to the direction of the plant rows 330. Because of the small size of these research plots, harvesters have been adapted to harvest and accurately measure the small amount of grain produced by each individual variety within the plots 310. The adapted harvesters are called research plot harvesters 10 or research plot combines 10 (referred herein as harvester or combines).

A research harvester 10 maybe a single-plot harvester or a split dual-plot harvester; additionally either of these harvesters can be formed with a unconventional grain flow pathway as is taught in a pending US application and as was taught in U.S. Pat. No. 5,518,454. In this invention, the harvester 10 is an improved continuously traveling harvester similar to the prior art harvester taught in U.S. Pat. No. 6,848,243. The U.S. Pat. No. 6,848,243 ('243) is, in its entirety, incorporated by reference herein. The harvester 10 of the present invention like the prior art harvester in '243 has a wheel 20 or track mounted combine chassis or main frame 30. The main frame 30 usually supports a cab 40 for the operator of the harvester 10, feeder house 60, a threshing assembly 70, separating assembly 80, a grain cleaning assembly 90, a weighing and data collection system 110, and a clean grain collection bin 120 and an engine to operate the harvester 10. The feeder house 60, threshing assembly 70, separating assembly 80, a grain cleaning assembly 90, together are referred to as the processing assembly 95. The combine main frame 20 is also adapted to support a harvesting head 50 which is usually detachable and can be adapted for use with a number of crops, i.e. corn head or a bean head. The harvesting head 50 for corn includes a grain feeding assembly 15, and intake or cross auger 25.

The harvester 10 and its components are operated by a power supply 140 which is usually activated and inactivated within the cab 40. The cab 40 also may hold the data collection storage device 110 that records test results gathered during the weighing and data collection part of the harvesting process. The cab may also contain any necessary hydraulic or pneumatic activation and inactivation device necessary for this invention.

In a standard harvester 10 there is a switch to deactivate the front portion of the grain harvesting equipment the harvesting head 50. The harvesting head 50 includes the grain feeding assembly 15 which severs the corn from the stock and drags the corn cob upwardly and rearwardly toward the cross auger 25. The cross auger 25 then moves the cob material into the feeder house 60 for deliver from there into the threshing assembly 70. In a standard harvester 10 there is also a switch to deactivate the rear portion of the grain harvesting equipment or the processing assembly 95. In the U.S. Pat. No. 6,848,243 a controller must be added to the harvester to selectively and separately operate each of the grain moving parts. In '243 prior art the threshing assembly, the separating assembly, the grain cleaning assembly, the feeding assembly, the blocking gate and the cross auger all have to be able to be separately and selectively capable of being inactivated from the power supply. The present invention does not require this controller nor does it require that the various grain moving parts be separately deactivated. A controller like that in '243 could also be employed on the present invention but is not necessary as the present invention does not require the machinery to be interrupted.

The prior to the '243 invention the prior art harvester stopped in the border lane to allow the complete processing of the grain through to the clean bin prior to entering a second plot. The stop time was the dwell time. The improvement shown in the invention in U.S. Pat. No. 6,848,243 allowed the harvester to continuously travel at a constant speed through a field of plots with intervening border lanes without stopping for dwell time. The mechanisms that avoided dwell time in the prior art '243 were adapted to stop the grain from the second plot from intermingling with the grain being processed from the first plot. More specifically with the use of the controller either a blocking gate was inserted between the cross auger 25 and the feeding house 60 or the cross auger 25 was stopped so it was not rotating and forcing the harvested material into the gate that was used to block material from entering the feeding house 60.

In contrast to '243, the present invention does not require the controller or the blocking gate nor the interruption of the power to the cross auger to eliminate the dwell time and maintain a continuous travel at approximately the same speed through out the fields contain these small strip plots. The present invention simply moves the cross auger 25 out of the harvested materials pathway. When the cross auger 25 is moved out of the pathway of the corn, the corn accumulates in the trough 35 below the cross auger 25. While traveling through the lane 320, the grain from the previous plot completes its processing through the processing assembly 95. The harvest material from the next plot is accumulating in the cross auger's trough 35 as the cross auger 25 is not in position to rotate the grain into the feeder house 60. The feeder housing (feeder house or housing are used interchangeably) 60 in most harvesters has a mouth 61 and a feeder drum 62 within the mouth 61 (see FIGS. 4 and 8). The mouth 61 is centered toward the middle of the cross auger 25 and does not usually extend across the length of the cross auger 25. Without the rearward pushing movement of the cross auger 25 the harvested material does not flow upwardly into the feeder house 60. A blocking gate in front or behind the feeding assembly is not necessary, in the present invention, to stop the commingling of material harvested in the first and second plots. The flow of the harvested material from the second plot is not commingled because the harvested material is not subjected to the force of the cross auger 25.

Some harvester heads have feeder assemblies that have more force than others. If the auger trough 35 of the cross auger 25 is slick or not particularly deep then the force of the feeder assembly may force some of the harvested crop through the auger trough 35 and into the mouth 61 of the feeder house 60 when the cross auger is in the nonengaged position, in other harvesters the crop material simply does not flow into the feeder house 60 when the cross auger 25 is not in the engaged position. If the forces or design of the harvester is such that crop can inadvertently flow into the harvester from the harvest head when the auger is in the nonengaged position then the harvested crop from the succeeding plot can become commingled with the crop of the prior plot. Commingling of crops from separate plots causes the measurements and collected data to be inaccurate and effectively makes the research plots results useless.

To avoid any issues with commingling of the various plots' harvested material in harvesters that may have a commingling concern, crop arrestors can be employed to inhibit the movement of the crop into the mouth 61 of the feeder house 60 when the auger 25 is in the unengaged position. These crop arrestors 63 are adapted to allow the crop material to flow into the feeder house 60 when the cross auger 25 is in the engaged position and moving the harvested material but the crop arrestors 63 act to inhibit the flow of the crop material when the cross auger 25 is in the nonengaged position.

Figure 5:
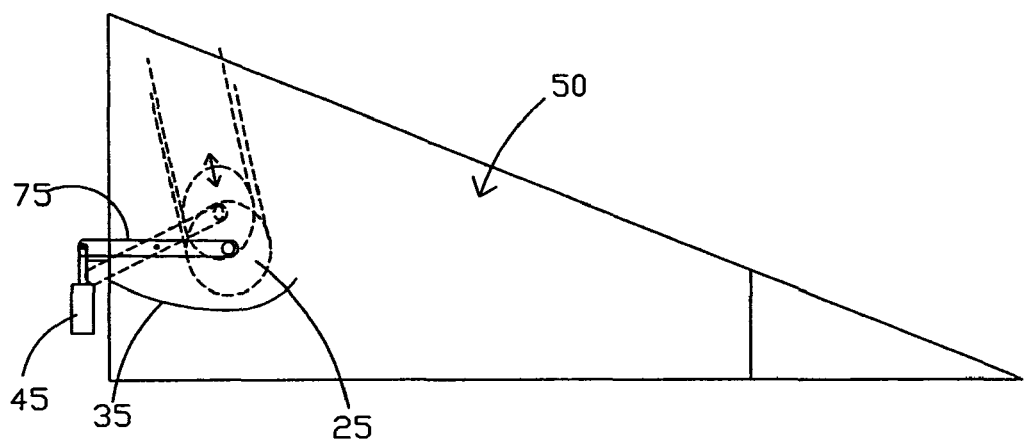
FIG. 5 is a schematic of the means for lifting the cross auger between positions.
Figure 4:
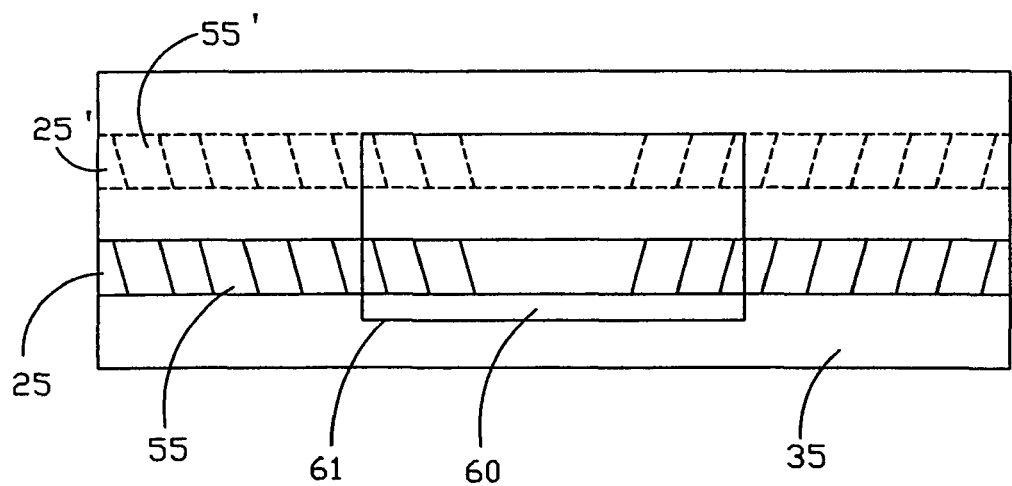
FIG. 4 is a schematic of a cross auger in two positions: one position for engagement of crop relative to the cross auger trough and the second position, shown in phantom, for nonengagement of crop relative to the cross auger trough.
Figure 6:
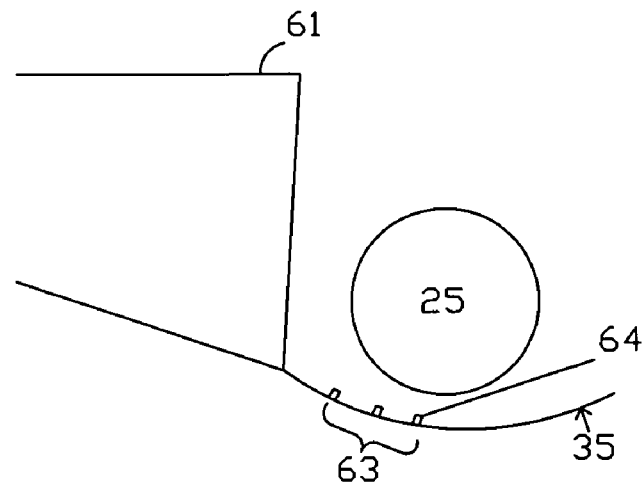
FIG. 6 is the side view of the feeder housing, the auger trough, and the auger in the engaged position showing the arrestors in cross section.
Figure 7:
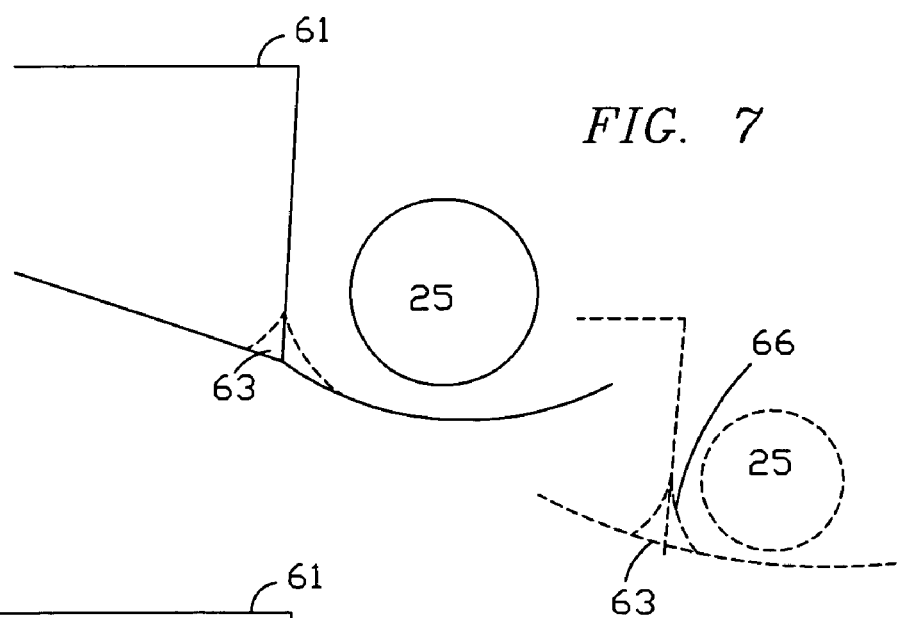
FIG. 7 is the side view of a dual plot harvester showing the feeder housing, the auger trough, and the split auger, one auger shown in phantom and both augers shown in the engaged position, with another embodiment of arrestors in cross section.
Figure 8:
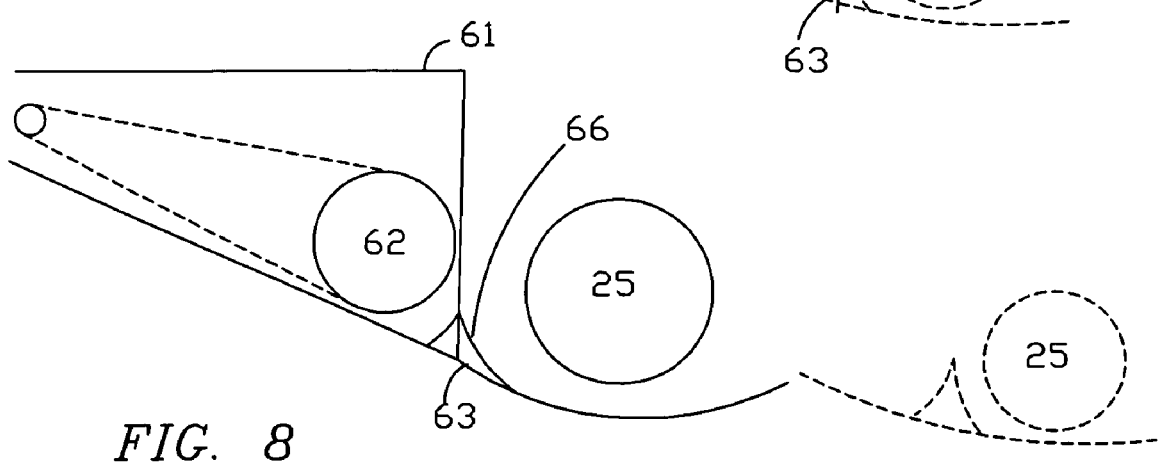
FIG. 8 is the side view of the feeder housing and the feeder drum, the auger trough, and the split auger in the engaged position, with another embodiment of the arrestor shown in mounted position proximate the feeder housing and in phantom in the unmounted position.

There are various embodiments of crop arrestors 63. A couple of embodiments are shown in FIGS. 6-8. FIG. 6 shows an arrestor 63 that is mounted within the trough 35. The arrestor 63 can be formed as attached metal strips 64, rubber strips or roughened tread like strips or small section of such materials. The arrestor 63 can be positioned throughout the entire trough 35 or can be positioned within the trough in the middle where the feeder house 60 mouth 61 is located. Alternatively the arrestor 63 can be formed as a trough lip 66. This embodiment of the arrestor can be formed in an inverted v shape. In this embodiment the inverted v is formed to overlap the mouth 61 of the feeder house 61 when the harvester head is attached to the feeder house 60 of the combine. Alternatively, the arrestor 63 could also be formed as extension of the trough 35, in other words only half of the inverted v (not shown), which would rest proximate to or slightly within the mount 61 of the feeder house 60. These embodiments of the arrestor 63 all act to inhibit the flow of the harvested crop material from sliding into the mouth 61 due to the movement of the material from the forces of crop accumulation and the feeder assembly. In FIG. 7 this embodiment of the arrestor 63 is shown in a dual plot combine where the cross auger 25 is split or divided into two separate sections 66. This embodiment of the arrestor 63 is formed in two parts to permit crop flow when the auger 25 is in the engaged position and to retard crop flow when the auger 25 is in the unengaged position. The cross auger 25 of the present invention continues to rotate, if so desired, when the auger is moved out of the path of the harvested material from the succeeding plot. FIGS. 4 and 5 shown a schematic of the invention. FIG. 4 shows the cross auger 25 and 25' in its two positions. Cross auger 25 is in the standard position that is crop engaging, in contrast cross auger 25' is in the second position which is not crop engaging. FIG. 5 shows a pneumatic or hydraulic cylinder 45 (one on each side of the cross auger 25; second cylinder not shown)

that is extended or retracted to move the cross auger 25 from the harvest material engaging position 55 to the unengaged position 55'. The weigh bucket or weigh buckets 111 on the present invention may employ pneumatics and thus a compressor (not shown) would be supported by the main frame 20. Thus an additional compressor for pneumatic lines would not be necessary for the cylinder. The pneumatic lines or hydraulic lines for connection to the cylinder would extend to the end of the feeder house 60 and attach with quick couplers (or the like) so that when the harvesting head 50 is attached to the main frame 20 the lines attached to the cylinders on the harvesting head 50 couple with the lines extending from the main frame and engage. This engagement produces the necessary force for the cylinders to move the cross auger 25 between the engaged 55 and unengaged positions 55'. The solid line cross auger 25 is shown as a solid line in FIG. 5 in the engaged position 55 and a dotted line cross auger 25 when in the unengaged position 55'.

Accordingly, the extension and retraction cycle of the hydraulic or pneumatic cylinder 45 which is mounted on the harvesting head 50 will move the cross auger 25 between the solid line position shown in FIG. 4 to the dotted line position shown in FIG. 4. Extension and retraction of the cylinders to pivot the auger lift bars 75 thus moving the cross auger 25 into the engaged 55 and non-engaged 55' position is controlled by an electronic solenoid valve. Both cylinders 45 are positioned proximate one end of the cross auger 25; if a dual harvester is employed with a split cross auger then there are four cylinders 45, two for each end of each cross auger 25. The cylinders 45 on each end of the cross augers 25 may be connected through a electrically actuated solenoid valve so that the cylinders 45 act together to either engage or disengage the cross auger from the auger trough 35.

The hydraulic or pneumatic cylinders 45 in the extension position have the cross auger 25 in position to engage 55 the harvested material. If hydraulic cylinders 45 are employed then these are connected to a supply of pressurized hydraulic fluid including reservoir and pump. If pneumatic cylinders 45 are employed then these are connected to a compressor to supply pressurized air. The cylinder 45 whether hydraulic or pneumatic is actuated through a retraction of the cylinder which positions the cross auger 25 such that it does not engage the harvested material after completing a plot and prior to entry into the next plot. While entering with the present invention into the next succeeding plot the grain from the prior plot is still being processed through the combine processing assembly 95 and data is collected. Additionally, the combine with the Harvesting head 50 of the present invention is harvesting material from the second plot which is being moved upwardly and rearwardly (relative to the forward motion of the combine) by the feeding assembly. However, the harvested material does not flow into feeder house 60 and therefore into the processing assembly 95 because the cross auger 25 is not in the cross auger trough 35 to provide the upward and rearward force need to force harvested material out of the auger trough 35 into the feeder house 60 and the threshing assembly 60. With the cross auger 25 in the unengaged position 55' the harvested material is collected in the auger trough 35 of the vacated cross auger 25. For a period of time, the cross auger 25 remains in the rotating but unengaged position 55', while the grain feeding assembly accumulates harvest material in auger trough 35, to avoid commingling of harvested material from the first plot with the harvested material of the second plot.

The reentry of the cross auger 25 into the auger trough 35 through the extension of the cylinders which complete the cylinders cycle can be accomplished in the correct time frame to avoid plot material commingling through a number of methods known to those skilled in the art. Some examples of how the extension cycle reentry can be triggered are by the harvester operator or through the use of a GPS system, by a signal from the data collection device or a sensor, like an optical eye, proximate the weigh bin or the weigh bin elevator or by setting the cycle to a predetermined time period or a predetermined distance. When triggered the extension of the cylinder moves the lift bars and thus moves the cross auger 25 back into engagement position 55 and completes the retraction extension cycle.

In operation the harvester 10 picks the crop and moves this crop/grain and straw upwardly and rearwardly with the grain feeding assembly 15. "Grain", and "straw" and are used for convenience and these terms are not intended to be limiting. Thus "grain" refers to that part of the crop material, which is threshed and separated, from the discardable part of the crop material which is referred to as "straw". Also "forward", "rearward", "left" and "right", when used are determined with reference to the direction of forward travel of the combine harvester 10. The terms "longitudinal" and "transverse" concerning the harvester are determined with reference to the fore-and-aft direction of the harvester. If this is a dual plot harvester then the grain feeding assembly 15 will feed the crop into each side of a divided cross auger. If this is not a dual plot harvester the cross auger will most likely not be divided. The cross auger 25 advances the crop into the feeder house 60 for deliver from there into the threshing assembly 70; again if this is a dual plot harvester then the feeder house 60 and the remaining process assembly 95 will maintain the two plots in separate areas of the harvester. The crop will be threshed and the grain and straw separated while the crop materials (both grain and straw) are advanced rearwardly.

Like conventional harvesters for research plots, this harvester 10 is adapted to harvest, weigh, measure and produce data from crop material. To accomplish this the present invention moves the crop/grain and straw through the threshing assembly 60, the separating assembly 70, and the grain cleaning assembly 80, within the combine 10. The result of these various assemblies or generally the result of the processing assembly 95 is the discard of the straw and the capture of the cleaned grain.

In one embodiment of this invention the clean grain is conveyed laterally, in one or two conveyors, in a reverse grain flow toward the left side of the combine, when facing the forward direction of travel of the combine, to be simultaneously weighed and measured. In an alternative embodiment, of the invention the reverse grain flow is not employed and the grain is conveyed toward the right side of the combine. Conveyor or conveying or conveyor means encompass a number of known methods for transporting grain within machinery. Some nonlimiting examples include conveyor belts, conveyor ladders, augers, slides, tracks, elevators, flightings, sliding plates, v or u shaped channels and the like. In a third embodiment if there is a dual plot harvester the grain could be conveyed separately to both the left and right side of the combine. This embodiment may then have separate weighing components 111 on each side of the harvester 10. Thereafter, if there are two portions of clean grain material it is commingled as it is conveyed to the clean grain tank 20.

The weighing components are known in the art and are available from a number of manufacturers including Carter. One of the embodiments of the present invention employing the dual plot reverse flow harvester uses the High Capacity Grain Gage, HM-2200 Twin Plot, available from Juniper Systems Incorporated located in Logan, Utah. The HM-2200 Twin Plot High Capacity Grain Gage is adapted for moisture collection, test weight data and plot weight on dual combines; the same manufacturer also makes a single plot grain gage for harvesters. The weigh bin bucket 111 may be sized to accommodate the entire volume of collected grain from each research test plot at a level below the bottom most end point of the sample bin (not shown) so that the sample bin is free to move about its pivot point even when grain is present in the weigh bin bucket 111. The grain is weighed and moisture sample data is collected and the material is conveyed and commingled in a clean grain tank. If there is a dual plot harvester there may be two weigh bins 111 or alternatively there may be only one weigh bin and a holding bin which only dumps into the weigh bin after the previous plot's grain has been measured and the data collected.

A cycle of the harvester 10 through a strip test plot in operation will have an operator to advance the harvester 10 into the strip test plot to harvest the ears of corn from the stalks at the beginning of the strip test plot. In the prior art the ground travel of the harvester 10 would be stopped when all of the ears of corn have been harvested off of the strip test plot and before the harvester 10 has entered the succeeding strip test plot. In the prior art of '243, the continuous harvester would not stop but operational parts of the harvester would be stopped and a blocking gate would be lowered to prohibit grain from the succeeding plot from commingling with the grain from the first strip test plot prior to the first strip plot's grain having been measured and data collected. In the present invention of the continuous harvester 10, the harvester 10 would not stop nor would any operational parts of the harvester be stopped nor would a blocking gate would be lowered. Instead, the cross auger 25 would be lifted out of the cross auger's engaged position 55 into the unengaged position 55' and the crop material would gather in the auger trough 35 until the first plot's grain is sufficiently segregated from the succeeding plot's grain so that the data that is taken is accurate for each plot and there is no commingling of the grain from the two plots until after the data from both has been collected. The operator, by listening to the operation of the harvester 10, waits until all of the harvested ears have been husked, shelled, cleaned, and conveyed to the holding bin 36 and then he can reengage the cross auger 25 in the engaged position 55. Alternatively, a small video camera can be mounted on the harvester with a view of the sample bin 382 and a video screen in the operator's cab to allow the operator to monitor visually the transfer of grain from the holding bin to the weigh bin. In yet another embodiment the cross auger is moved into and/or out of the unengaged position automatically by employing an optical eye or a timing device or GPS or thorough a number of known methods in the art for actuating machinery. The harvester 10 which has been advancing into the succeeding test plot and has had crop accumulating in the auger trough 35 is then reengages the auger 25 so that the grain in the well is conveyed into the processing assembly 95.

A known microprocessor can be employed to calculate the data received from the sample and or weigh bin. Electronics to complete the data gathering and analysis is well known in the art. It is preferred that the sensor and control electronics of the grain measuring apparatus is located near the grain measuring apparatus whereas means for recording collected data is mobile like a computer or hand held device or and if not mobile located in the operator's cab.

Although the invention has been described with respect to a preferred embodiment thereof, it is to be also understood that it is not to be so limited since changes and modifications can be made therein which are within the full intended scope of this invention as defined by the appended claims.

We claim:

1. A combine harvester adapted to harvest a crop comprising:
   a main frame;
   a grain feeding assembly located proximate at least one cross auger and auger trough, said cross auger actuatable between a first engaged position wherein relative to said auger trough, said auger is partially within said trough and said engaged position is adapted to deliver crop from said trough when harvesting and a second unengaged position relative to said auger trough wherein said auger is not positioned partially within said trough and the unengaged position is adapted to accumulate undelivered crop in the auger trough when harvesting;
   a processing assembly comprising at least one threshing, separating and cleaning assembly, mounted to said main frame said processing assembly adapted to receive crop comprising straw and grain from said cross auger and extract clean grain from said crop;
   at least one conveyor for moving clean grain to a position for data collection.

2. A combine harvester according to claim 1 wherein in the first engaged position of said cross auger, said cross auger is positioned partially within the trough.

3. A combine harvester according to claim 1 wherein in the second unengaged position of said cross auger, said cross auger is not positioned partially within the trough.

4. A combine harvester according to claim 1 wherein the grain feeding assembly harvests said crop and moves said crop proximate the auger trough.

5. A combine harvester according to claim 4 wherein when the cross auger is in the first engaged position, said cross auger is positioned partially within the trough, wherein the crop proximate the auger trough is fed into a feeder house.

6. A combine harvester according to claim 4 wherein when the cross auger is in the second unengaged position, said cross auger is not positioned partially within the trough, wherein the crop proximate the auger trough is accumulated in the auger trough.

7. A combine harvester according to claim 1 having a divided cross auger and a divided auger trough adapted to maintain two crops from being commingled.

8. A combine harvester according to claim 7 wherein the divided cross auger is formed as two separate cross augers and when each said cross auger is positioned in the first engaged position of said cross auger, the crop proximate the auger trough is fed into a feeder house proximate the threshing assembly.

9. A combine harvester according to claim 7 wherein the divided cross auger is formed as two separate cross augers and when each said cross auger is in the second unengaged position of said cross auger, the crop proximate the auger trough is accumulated.

10. A combine harvester according to claim 1 wherein said data collection comprises a weigh bucket for receiving and measuring clean grain, said weigh bucket is positioned on the left of the combine, wherein the clean grain moves to said weigh bucket on the left of the combine when looking at the back end of the combine and facing the direction of forward travel of said combine.

11. A combine harvester according to claim 1 adapted to harvest small plots of crop separated by lanes wherein said cross auger is moved between said first, and second position relative to said auger trough by employing at least one cylinder.

12. A combine harvester adapted to harvest a crop comprising:
   a main frame;
   a grain feeding assembly located proximate at least one rotating cross auger and an associated auger trough, said cross auger remotely actuatable between at least two rotating positions, a crop engaging position proximal said auger trough and a crop nonengaging position distal to said auger trough;
   at least one threshing, separating and cleaning assembly mounted to said main frame adapted to receive crop comprising straw and grain from said cross auger into a feeder house proximate the threshing assembly and extract clean grain from said crop;
   at least one conveyor for moving clean grain;
   at least one weigh bucket positioned for receiving and measuring clean grain; and,
   a grain tank for receiving clean grain weighed by said at least one weigh bucket.

13. A method for continuously harvesting and measuring grain from one or more varieties or hybrids of crop within plots divided by lanes without crop comprising the steps of:
   1) harvesting, with a harvester comprising grain moving parts, a crop into a feeding assembly of said travelling harvester, said crop harvested from a discrete plot of a plurality of plots divided by lanes, and delivering from each said discrete plot, said variety or hybrid crop to a cross auger and associated auger trough for delivery to a processing assembly wherein the grain is removed from the straw, and clean grain is conveyed for data collection;
   2) travelling continuously across said lane to a succeeding discrete plot in said plurality of plots;
   3) activating said cross auger into a crop nonengaging position wherein the crop from the succeeding plot is delivered to the auger trough but is not delivered to the processing assembly until cleaned grain from the previous plot has been conveyed from the processing assembly therefore avoiding commingling of the grain of the previous plot crop with the succeeding plot crop; and
   4) activating said cross auger into a crop engaging position wherein the crop from the succeeding plot accumulated within the auger trough and the crop harvested by feeding assembly from the succeeding plot are delivered to the processing assembly wherein the grain is removed from the straw, and clean grain from the succeeding plot is conveyed to be measured and weighed separately from crop material from any other of the plurality of crops while the harvester is continuously travelling.

14. The combine harvester according to claim 12 wherein the harvester is a dual plot harvester.

15. The method according to claim 13 wherein the clean grain is conveyed to the left side of the harvester when viewed from the rear of the harvester facing the direction of forward travel of the harvester to one weigh bucket positioned for receiving and measuring clean grain.

16. The method according to claim 13 wherein the activating of the cross auger is automated.

17. The method according to claim 13 wherein the cross auger in the engaging position rotates.

18. The method according to claim 13 wherein the cross auger in the nonengaging position rotates.

19. The method according to claim 13 wherein the grain moving parts of the harvester are not interrupted during the continuous travelling and harvest of the plurality of the plots.

20. A combine harvester according to claim 1, including actuating machinery for actuating movement of said cross auger, said actuating machinery selected from the group consisting of an optical eye, a timing device, or GPS.

* * * * *